US011570569B2

United States Patent
Mate et al.

(10) Patent No.: US 11,570,569 B2
(45) Date of Patent: Jan. 31, 2023

(54) ASSOCIATED SPATIAL AUDIO PLAYBACK

(71) Applicant: Nokia Technologies Oy, Espoo (FI)

(72) Inventors: Sujeet Shyamsundar Mate, Tampere (FI); Adriana Vasilache, Tampere (FI); Lasse Laaksonen, Tampere (FI); Kari Jarvinen, Vantaa (FI); Antti Eronen, Tampere (FI); Jussi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 171 days.

(21) Appl. No.: 16/960,723

(22) PCT Filed: Jan. 14, 2019

(86) PCT No.: PCT/FI2019/050025
§ 371 (c)(1),
(2) Date: Jul. 8, 2020

(87) PCT Pub. No.: WO2019/141900
PCT Pub. Date: Jul. 25, 2019

(65) Prior Publication Data
US 2020/0344563 A1    Oct. 29, 2020

(30) Foreign Application Priority Data
Jan. 19, 2018    (GB) .................................... 1800920

(51) Int. Cl.
*H04S 7/00*    (2006.01)
*G06F 3/01*    (2006.01)
(Continued)

(52) U.S. Cl.
CPC .............. *H04S 7/304* (2013.01); *G06F 3/012* (2013.01); *H04R 1/406* (2013.01); *H04R 3/005* (2013.01);
(Continued)

(58) Field of Classification Search
CPC ...... H04S 7/304; H04S 3/008; H04S 2400/01; H04S 2400/11; H04S 2400/13;
(Continued)

(56) References Cited

U.S. PATENT DOCUMENTS 9,363,569 B1 * 6/2016 van Hoff ............ H04N 5/23238
2005/0105442 A1   5/2005 Melchior et al.
(Continued)

FOREIGN PATENT DOCUMENTS

CN    1795696 A    6/2006
CN    1849845 A    10/2006
(Continued)

OTHER PUBLICATIONS

"Information technology—High efficiency coding and medial delivery in heterogeneous environments—Part 3:3D audio", ISO/IEC JTC 1/SC29, ISO/IEC 23008-3:201x€, Oct. 12, 2016, 793 pages.

*Primary Examiner* — William A Jerez Lora
(74) *Attorney, Agent, or Firm* — Harrington & Smith

(57) ABSTRACT

An apparatus including at least one processor and at least one memory including computer code for one or more programs, the at least one memory and the computer code configured, with the at least one processor, to cause the apparatus at least to: generate content lock information for a content lock, wherein the content lock information enables control of audio signal processing associated with audio signals related to one or more audio sources based on a position and/or orientation input.

20 Claims, 16 Drawing Sheets

(51) Int. Cl.
*H04R 1/40* (2006.01)
*H04R 3/00* (2006.01)
*H04S 3/00* (2006.01)

(52) U.S. Cl.
CPC ........ H04S 3/008 (2013.01); *H04R 2201/401* (2013.01); *H04R 2430/20* (2013.01); *H04S 2400/01* (2013.01); *H04S 2400/11* (2013.01); *H04S 2400/13* (2013.01)

(58) Field of Classification Search
CPC .. H04R 1/406; H04R 3/005; H04R 2201/401; H04R 2430/20; G06F 3/012
USPC .......................................... 381/303, 306, 361
See application file for complete search history.

(56) References Cited

U.S. PATENT DOCUMENTS

| | | | |
|---|---|---|---|
| 2010/0053210 A1 | 3/2010 | Kon | |
| 2014/0010391 A1* | 1/2014 | Ek | G06F 3/012 |
| | | | 381/310 |
| 2014/0058662 A1* | 2/2014 | Tachibana | G01C 21/00 |
| | | | 701/428 |
| 2014/0177846 A1 | 6/2014 | Strub | |
| 2014/0306891 A1* | 10/2014 | Latta | G06F 3/011 |
| | | | 345/158 |
| 2015/0281867 A1 | 10/2015 | Enamito et al. | |
| 2015/0301592 A1* | 10/2015 | Miller | G06F 3/013 |
| | | | 345/156 |
| 2016/0183024 A1 | 6/2016 | Karkkainen et al. | |
| 2016/0266865 A1 | 9/2016 | Tsingos et al. | |
| 2017/0289724 A1 | 10/2017 | Breebaart et al. | |
| 2017/0372748 A1 | 12/2017 | McCauley et al. | 27/31 |

FOREIGN PATENT DOCUMENTS

| | | |
|---|---|---|
| CN | 101662720 A | 3/2010 |
| CN | 105684467 A | 6/2016 |
| CN | 106688253 A | 5/2017 |
| CN | 106851525 A | 6/2017 |
| CN | 107211216 A | 9/2017 |
| EP | 3 264 259 A1 | 1/2018 |
| WO | WO-2013/064914 A1 | 5/2013 |
| WO | WO-2014/190099 A1 | 11/2014 |

* cited by examiner

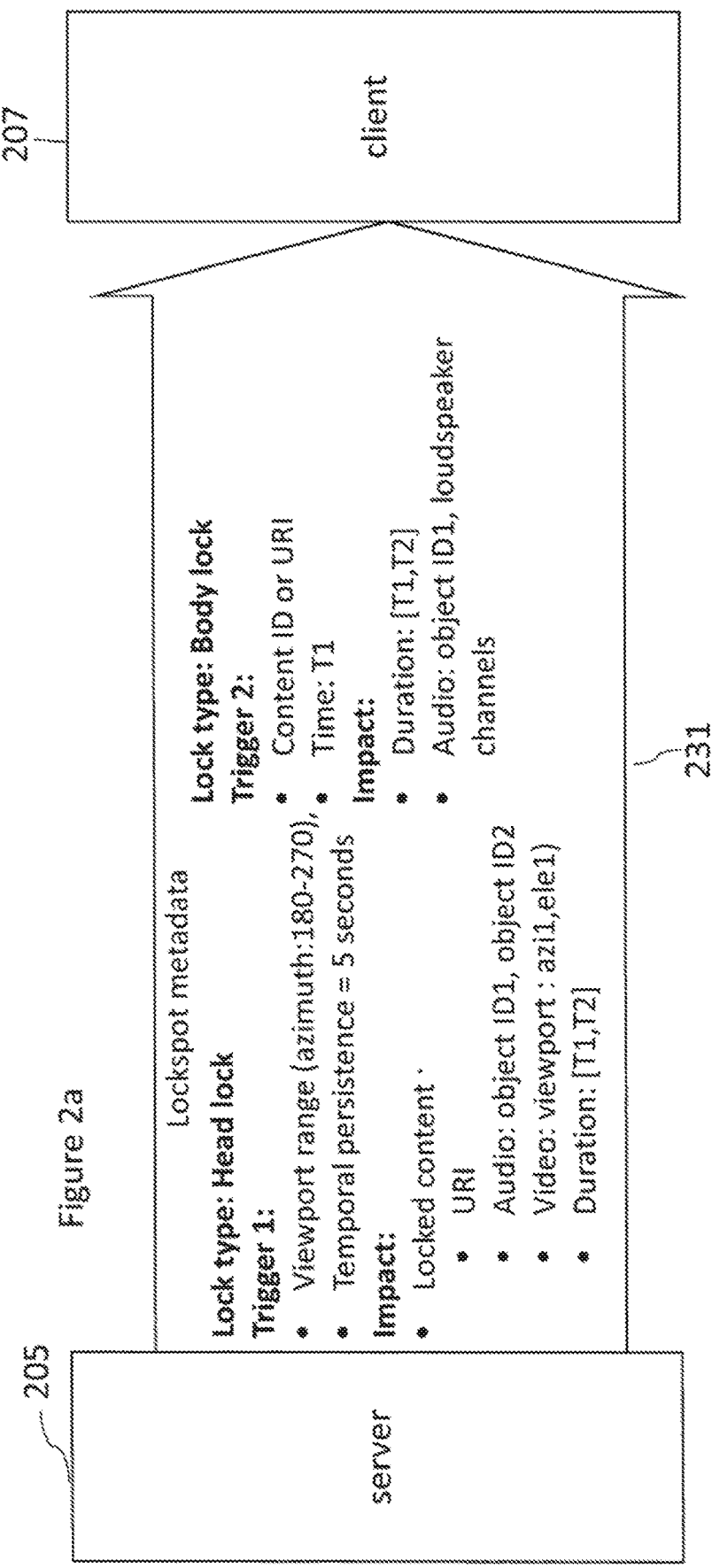

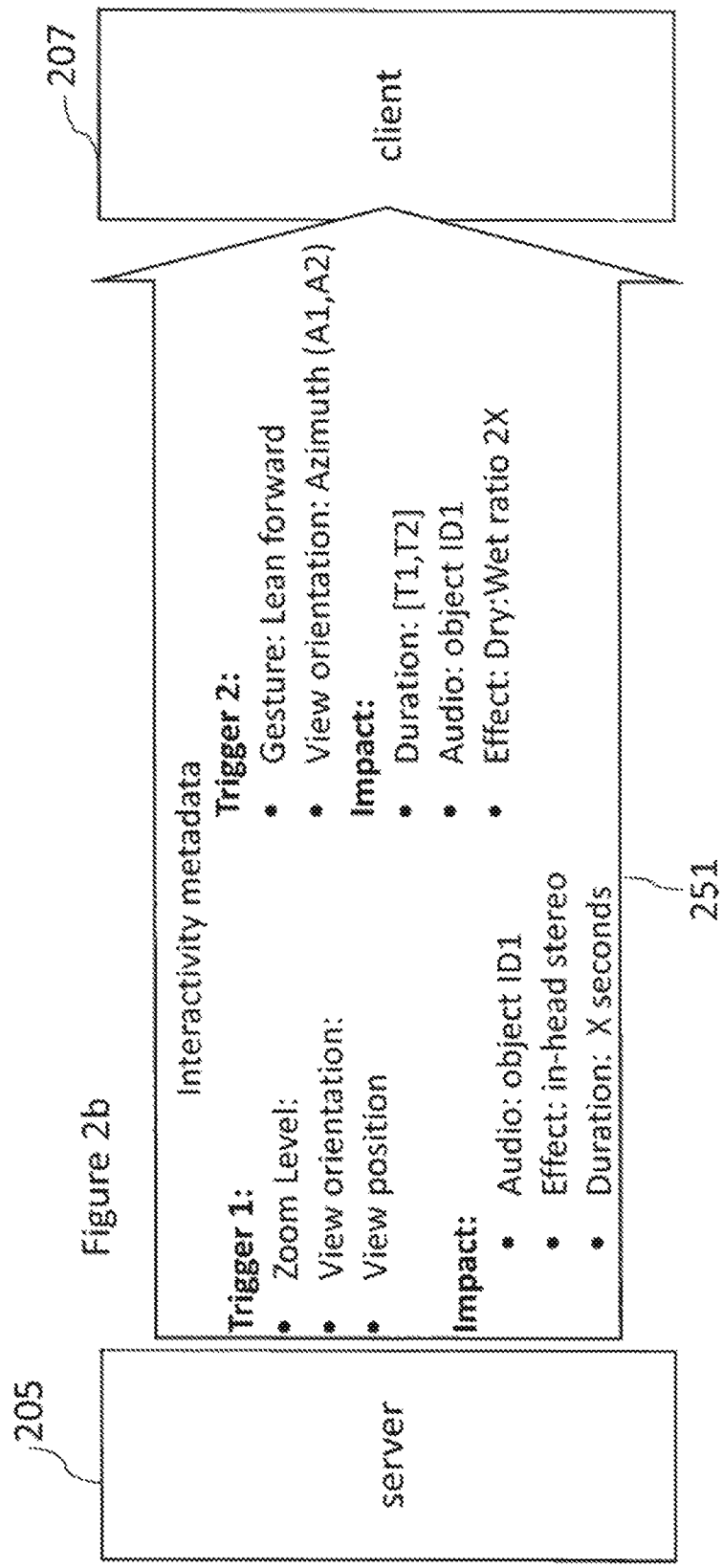

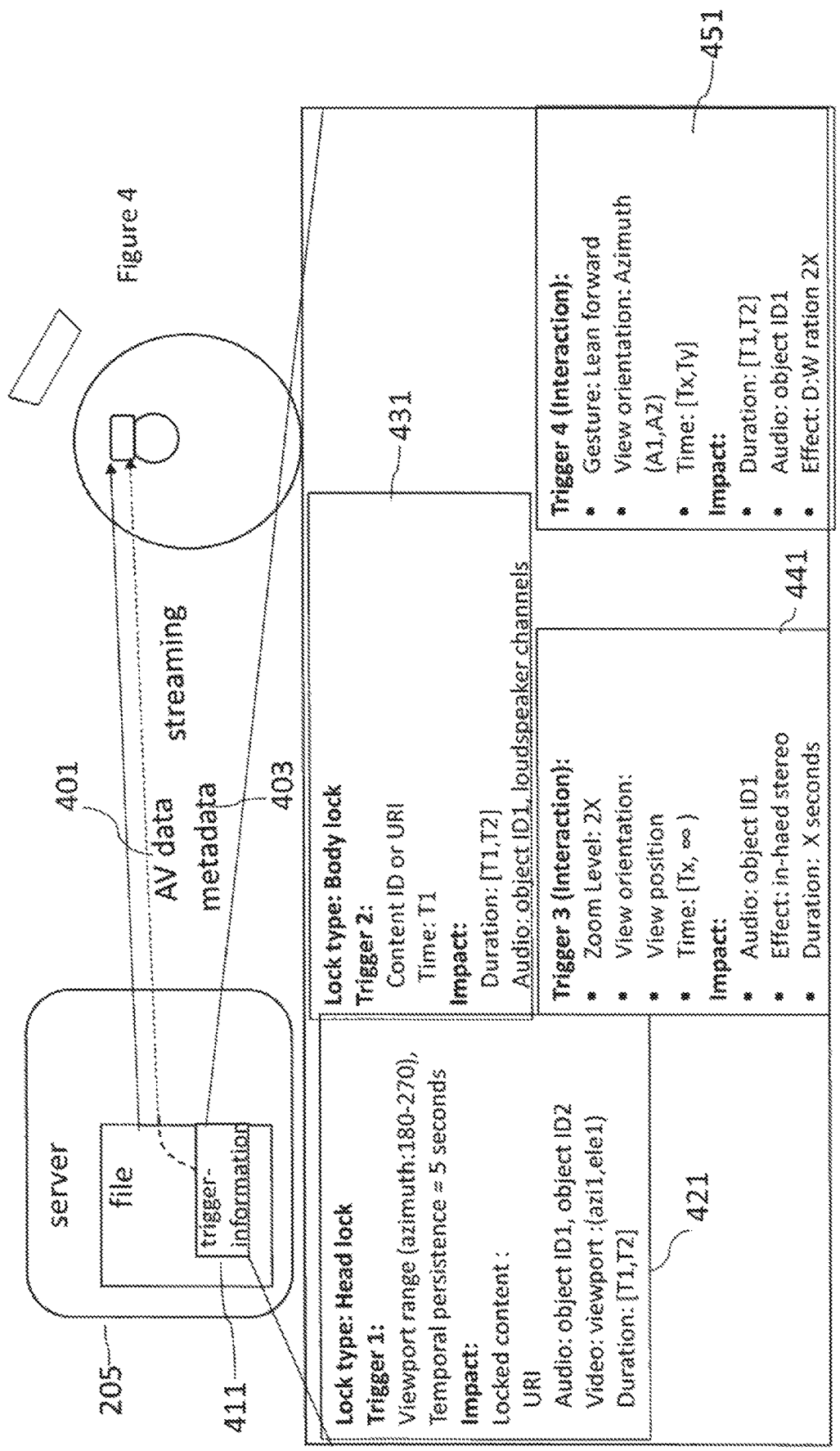

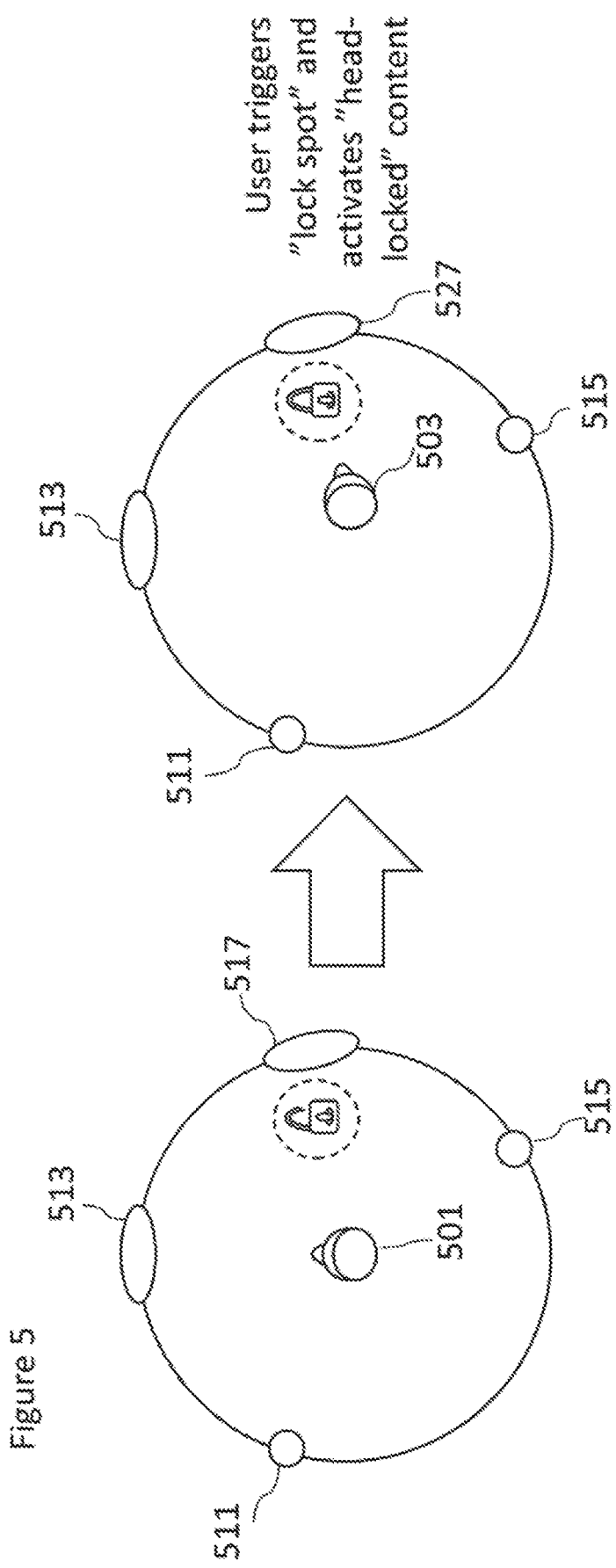

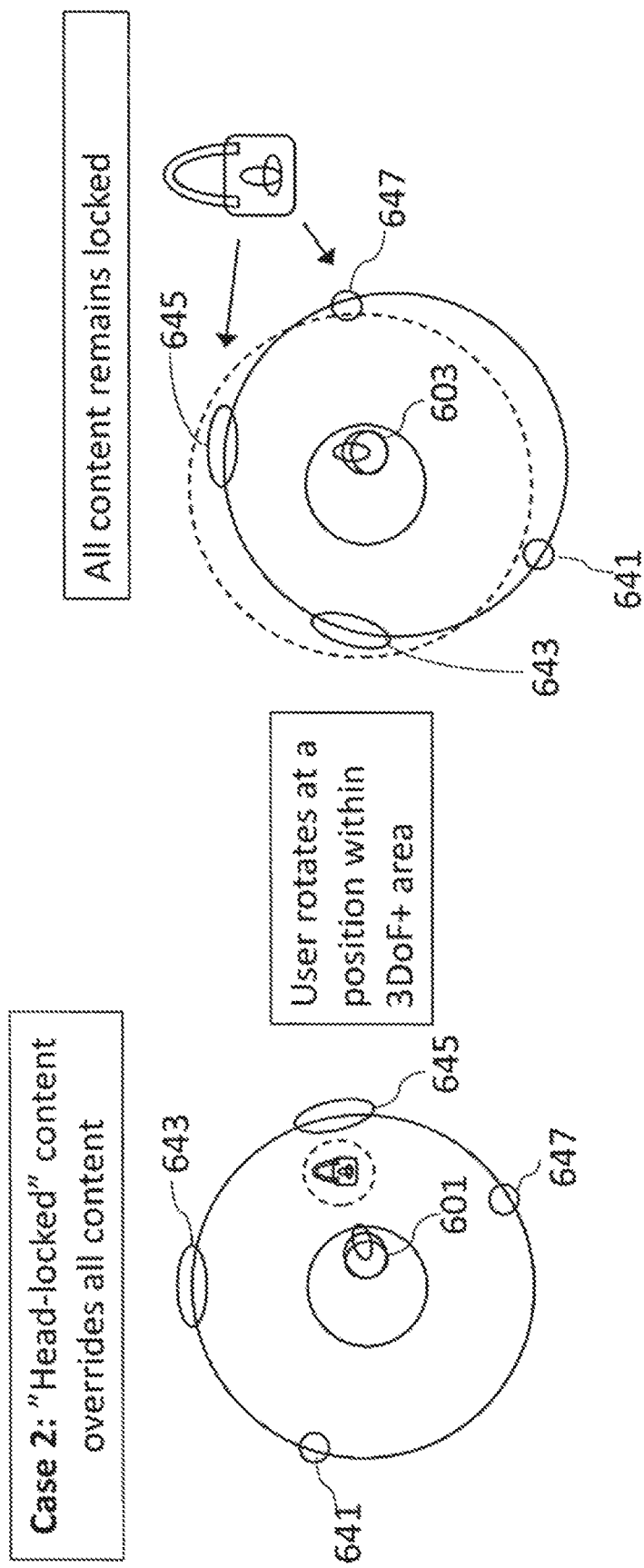

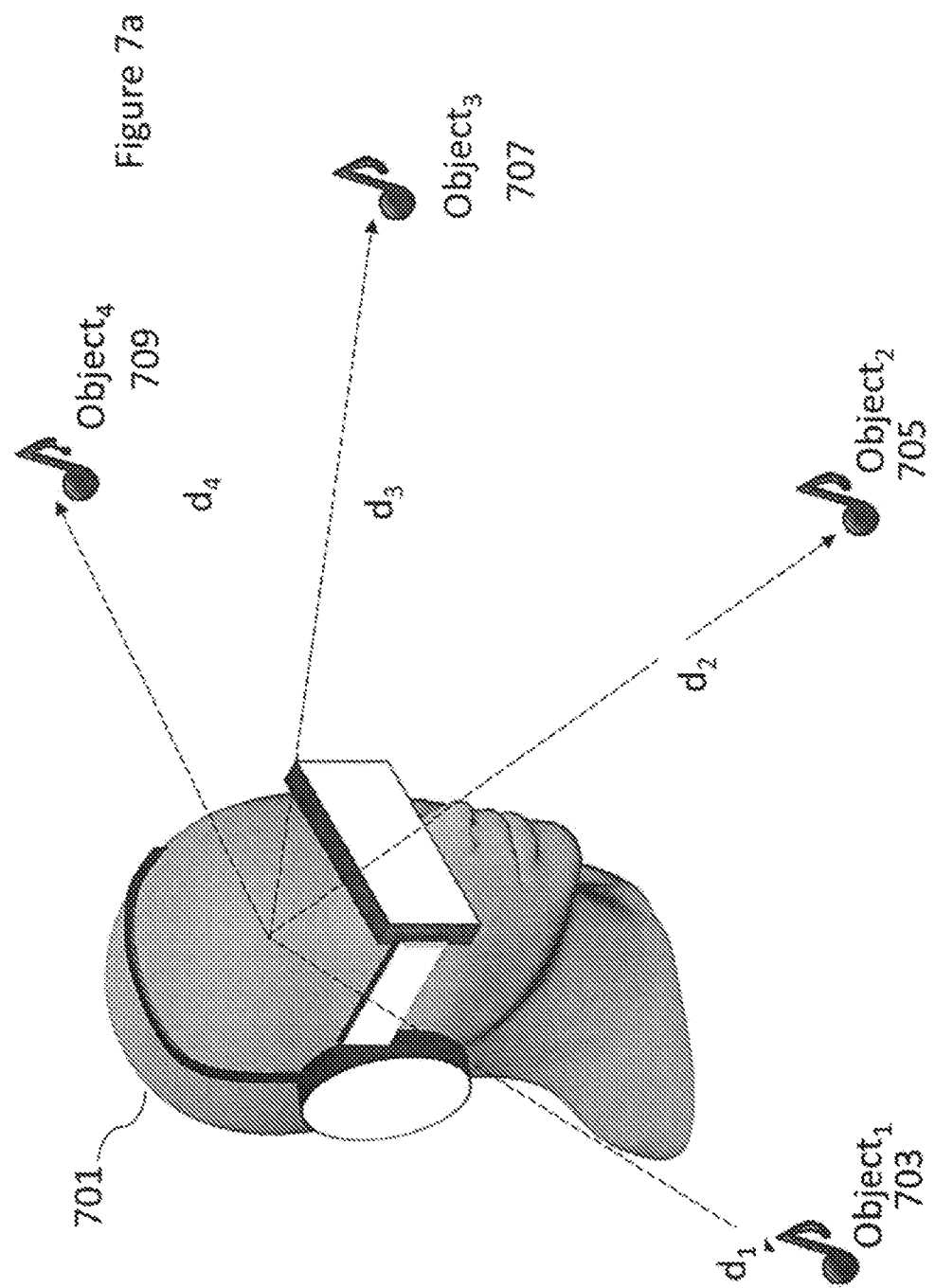

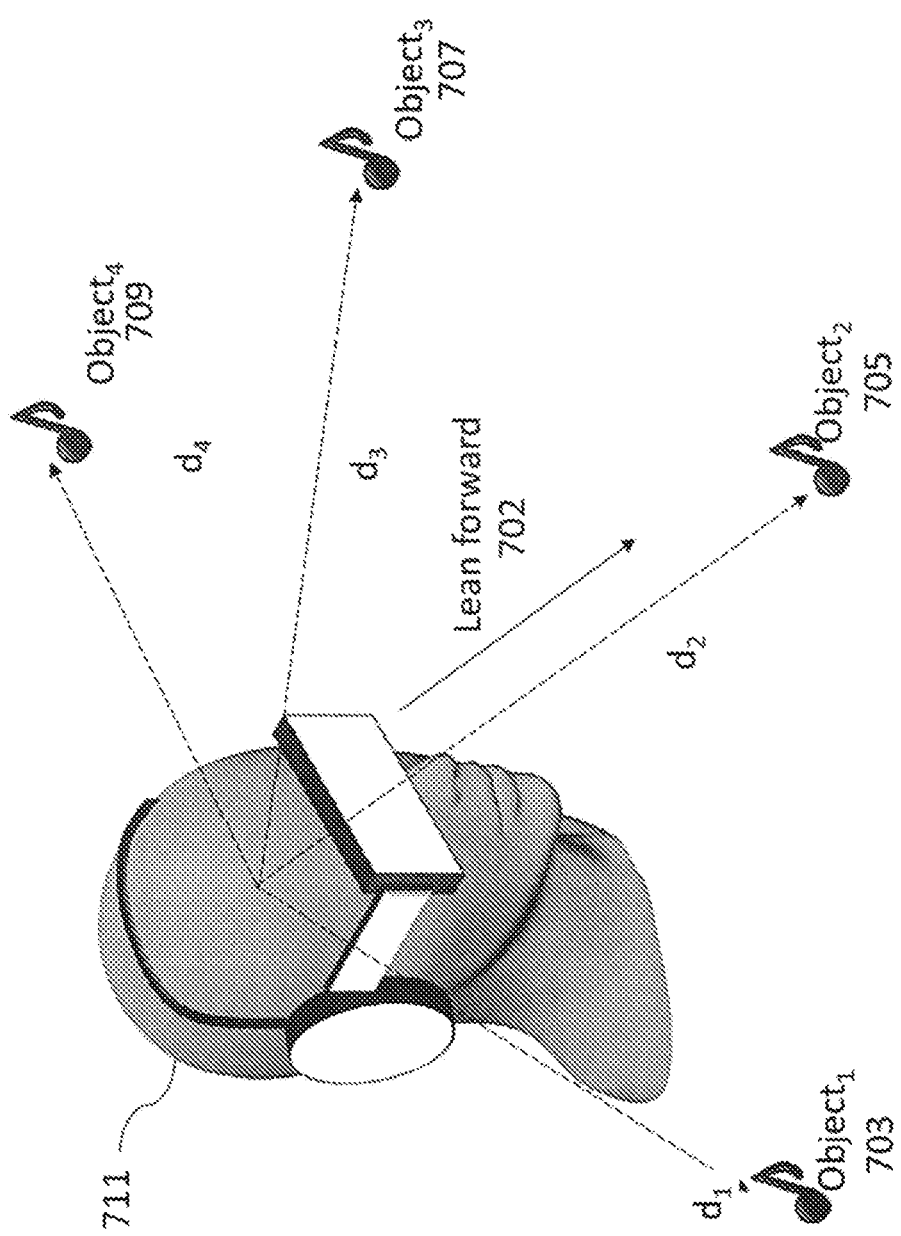

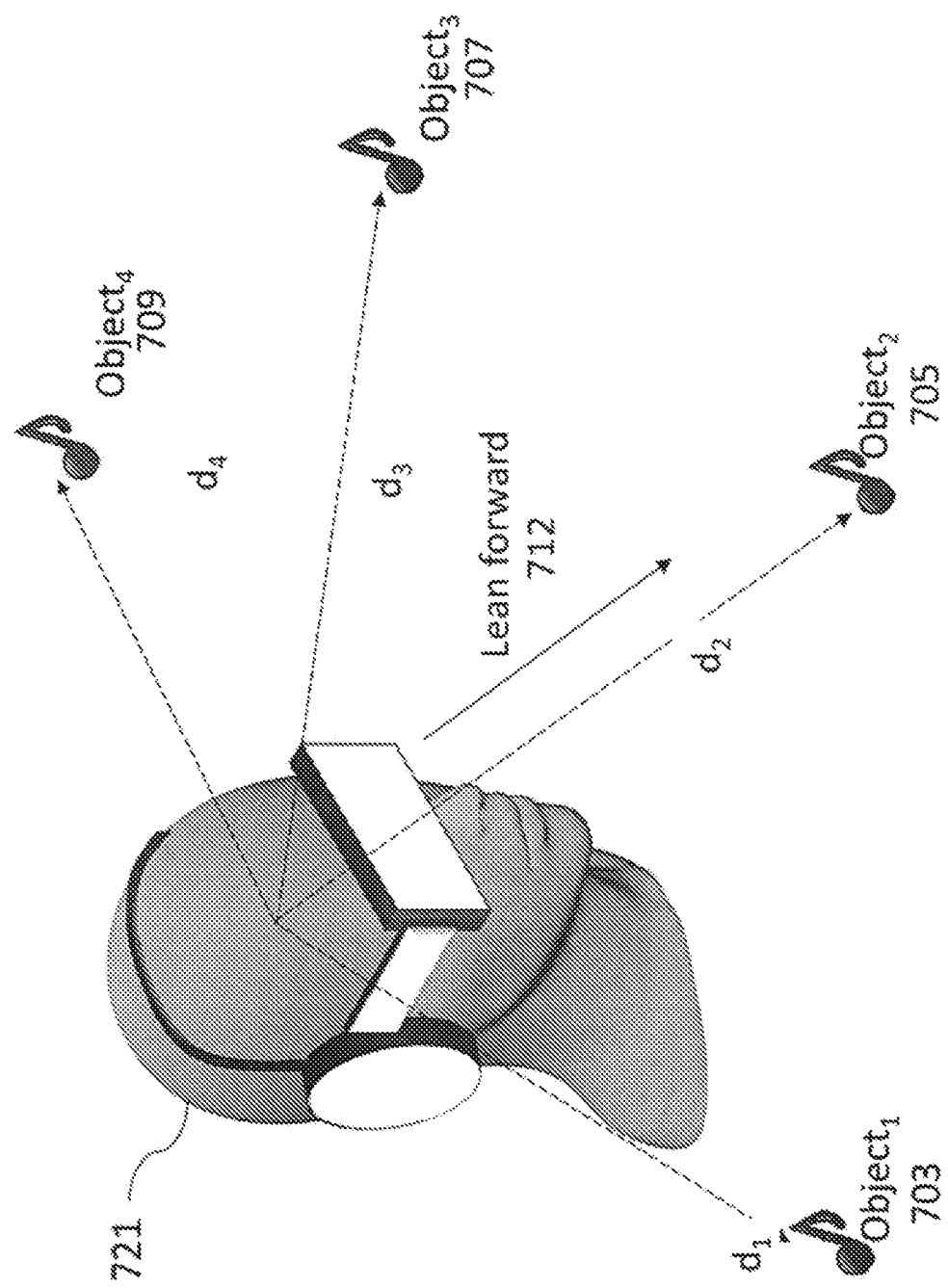

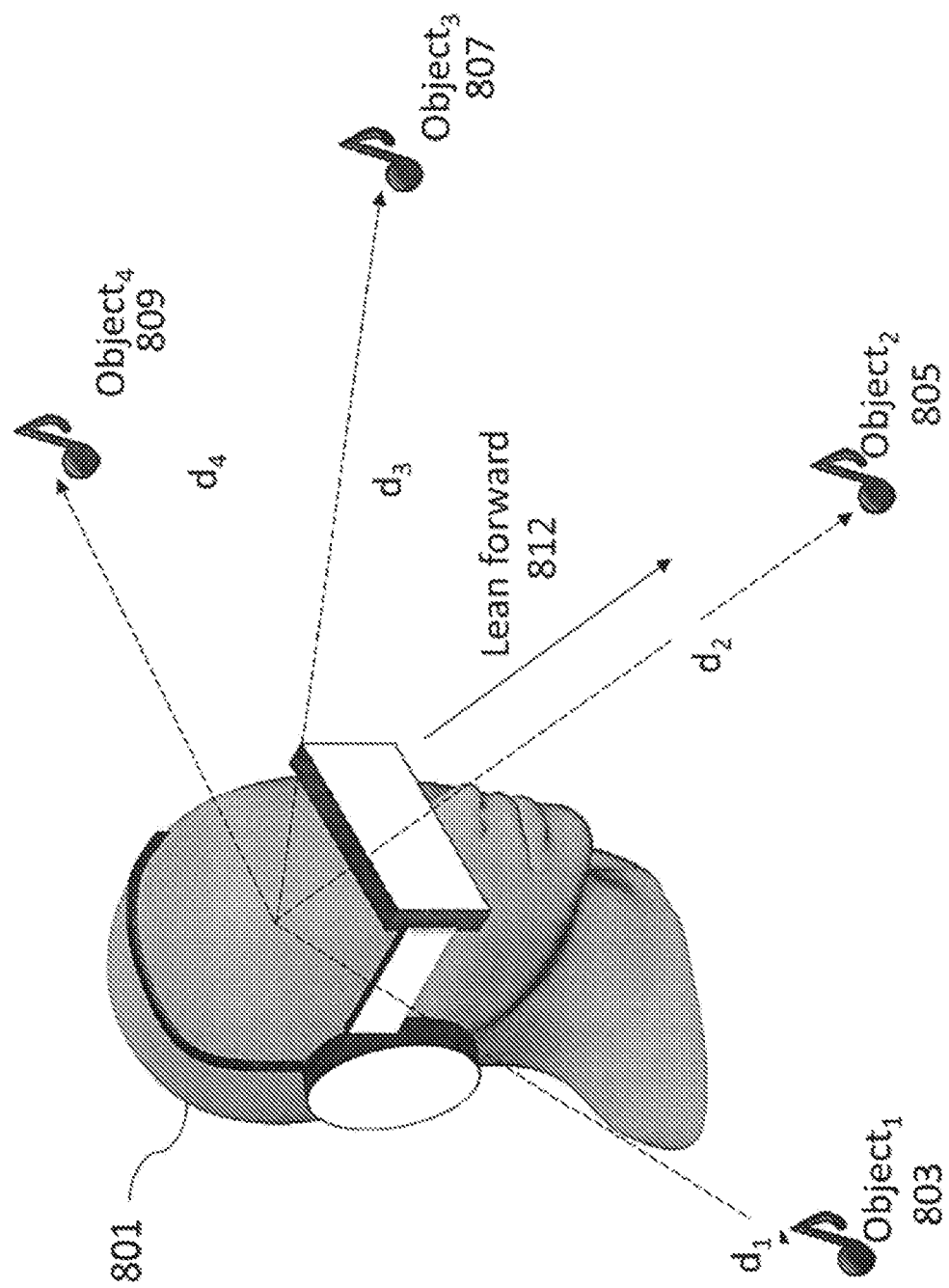

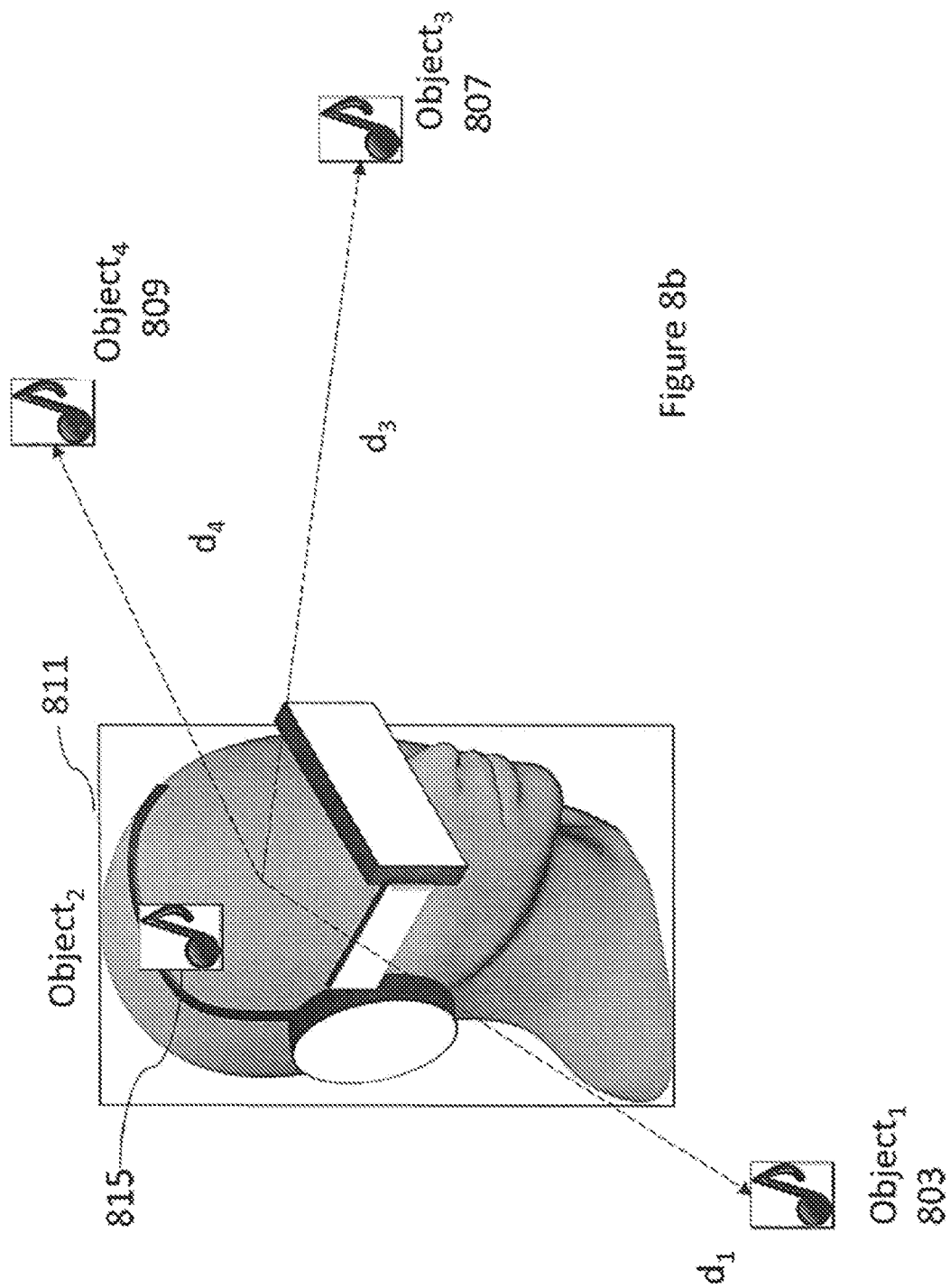

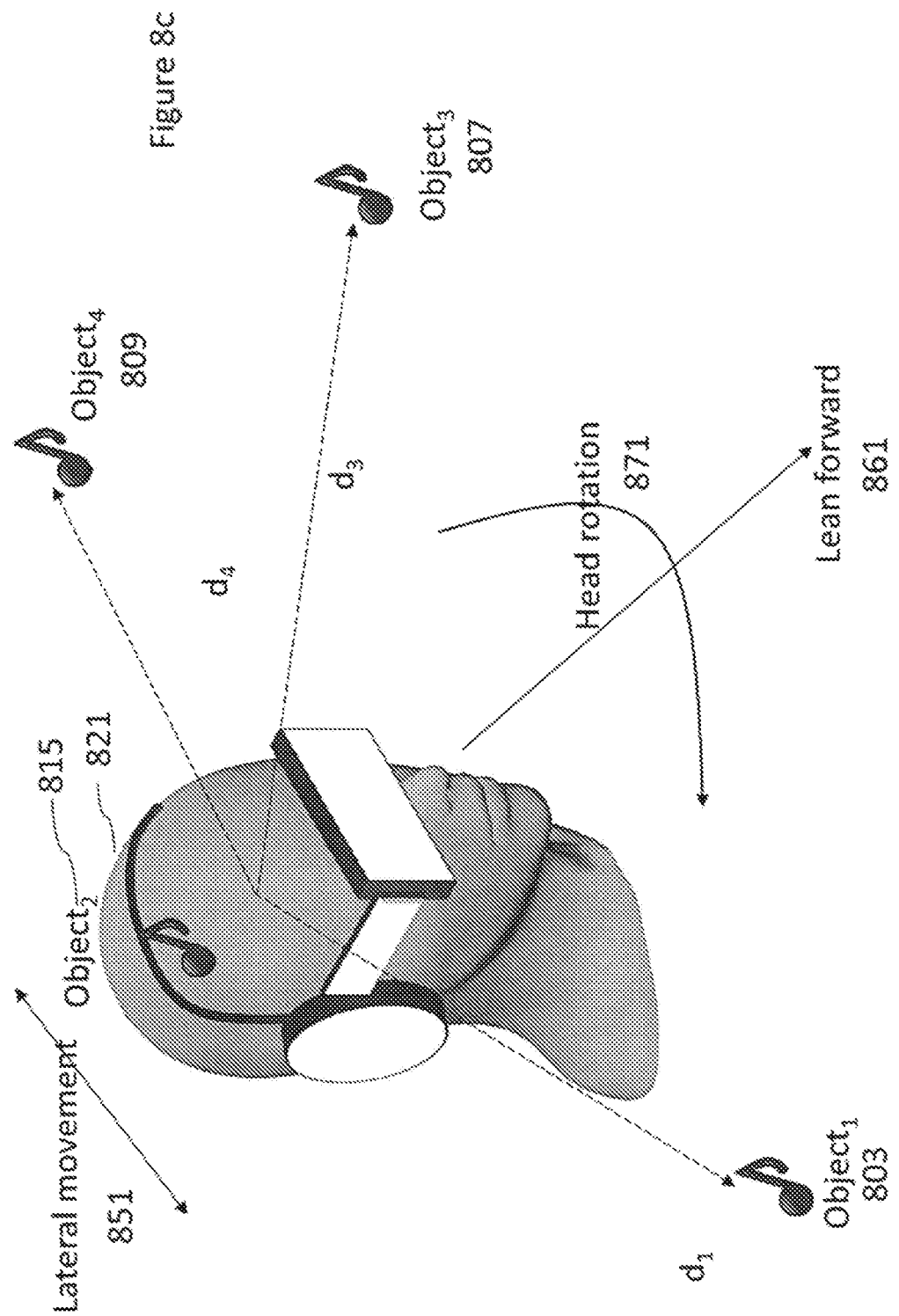

ASSOCIATED SPATIAL AUDIO PLAYBACK

CROSS REFERENCE TO RELATED APPLICATION

This patent application is a U.S. National Stage application of International Patent Application Number PCT/FI2019/050025 filed Jan. 14, 2019, which is hereby incorporated by reference in its entirety, and claims priority to GB 1800920.9 filed Jan. 19, 2018.

FIELD

The present application relates to apparatus and methods for spatial audio playback.

BACKGROUND

In a 3D space, there are six degrees of freedom defining the way a user may move within said space. This movement is divided into two categories: rotational and translational movement (with three degrees of freedom each). Rotational movement is sufficient for a simple virtual reality (VR) experience where the user may turn their head (pitch, yaw, and roll) to experience the space from a static point. Translational movement means that the user may also change the position of the rendering. In other words move along the x, y, and z axes according to their wishes. Free-viewpoint augmented reality (AR) and VR experiences allow for both rotational and translational movements.

It is common to talk about the degrees of freedom (and the related experiences) using the terms 3DoF (three degrees of freedom), 3DoF+ and 6DoF (six degrees of freedom). 3DoF+ falls somewhat between 3DoF and 6DoF in that it allows for some limited user movement, for example a restricted translational degree of freedom while allowing full range of motion for the rotational movement. Thus 3DoF+ can sometimes be considered to implement a restricted 6DoF where the user is sitting down but can lean their head in various directions.

The ISO/IEC Moving Picture Experts Group (MPEG) is currently standardizing immersive media technologies under the name MPEG-I. This includes methods for various virtual reality (VR), augmented reality (AR) or mixed reality (MR) use cases. MPEG-I is divided into three phases: Phases 1a, 1b, and 2. Phases 1a and 1b consider 3DoF and 3DoF+ use cases, and Phase 2 will then allow at least significantly unrestricted 6DoF. For audio standardization, the focus is already on 6DoF audio, as existing methods are thought to cover at least significant parts of the 3DoF/3DoF+ use cases. However, there are certain aspects where at least 3DoF+ (Phase 1b) standards will require further development.

Immersive or spatial audio (for 3DoF/3DoF+/6DoF) may consist of various audio signals and information. For example a channel-based bed and audio objects, first-order or higher-order ambisonics (FOA/HOA) and audio objects, any combination of these such as audio objects only, or any equivalent spatial audio representation may be used. These audio signals may be carried as MPEG-H 3D Audio, specified as ISO/IEC 23008-3 (MPEG-H Part 3), audio coding standard, along with additional metadata and new rendering technology which will constitute the MPEG-I Audio standard.

SUMMARY

There is provided according to a first aspect an apparatus comprising at least one processor and at least one memory including computer code for one or more programs, the at least one memory and the computer code configured, with the at least one processor, to cause the apparatus at least to: generate content lock information for a content lock, wherein the content lock information enables control of audio signal processing associated with audio signals related to one or more audio sources based on a position and/or orientation input.

The content lock information may furthermore enable control of image processing of images based on the position and/or orientation input.

The apparatus caused to generate content lock information may be caused to generate at least one of: a trigger parameter caused to activate a content lock; an identifier configured to identify at least one audio source; and at least one content lock type to be applied to the at least one audio source.

The at least one content lock type is at least one of: a translational lock for locking the at least one audio source translationally; a rotational lock for locking the at least one audio source rotationally; a head lock for locking the at least one audio source translationally and rotationally; a body lock for locking the at least one audio source rotationally and for not locking the at least one audio source translationally; a hard lock for locking the at least one audio source with no motion; and a soft lock for locking the at least one audio source within a range of values.

The trigger parameter may comprise at least one of: a viewport range defined in at least one of: azimuth and elevation; a time range; and an object identifier.

The apparatus caused to generate content lock information may be further caused to generate at least one of: an image effect to be applied to an image when the content lock is implemented; an audio effect to be applied by the audio signal processing when the content lock is implemented.

The content lock information may comprise interactivity information, wherein the interactivity information comprises at least one of: a trigger identifier caused to associate the information to at least one content lock trigger; an impact effect linked to the trigger identifier, the impact effect defining an effect to be applied by the audio signal processing associated with audio signals related to one or more audio sources based on a position and/or orientation input.

The at least one audio signalling processing effect may comprise at least one of: an emphasis in gain; a de-emphasis in gain; an increase in spatial extent; and a decrease in spatial extent.

The apparatus may be further caused to: obtain the audio signals related to the one or more audio sources; analyse the audio signals to generate information related to the one or more audio sources; transmit the audio signals, information related to the one or more audio sources and the content lock information to at least one further apparatus.

The apparatus caused to obtain the audio signals related to the one or more audio sources may be caused to perform at least one of: capture the audio signals; and receive the audio signals from at least one audio capture apparatus.

The apparatus may be further caused to: capture at least one image, the image being associated with the one or more audio sources; and transmit the at least one image with the audio signals, information related to the one or more audio sources and the content lock information to the at least one further apparatus.

The apparatus caused to transmit the audio signals, information related to the one or more audio sources and the audio effect information to at least one further apparatus may be caused to transmit the content lock information as one of:

in-band information with the audio signals; and out-of-band information with the audio signals.

According to a second aspect there is provided an apparatus comprising at least one processor and at least one memory including computer code for one or more programs, the at least one memory and the computer code configured, with the at least one processor, to cause the apparatus at least to: receive at least one audio signal; receive information associated with at least one audio source; receive content lock information, the content lock information associated with at least one audio source; receive at least one position and/or orientation input; and process the at least one audio signal based on the information associated with at least one audio source and content lock information, further based on the position and/or orientation input.

The apparatus may be further caused to: receive at least one image; and image process the at least one image based on the content lock information and the position and/or orientation input.

The apparatus caused to receive content lock information may be caused to receive at least one of: a trigger parameter caused to activate a content lock; an identifier configured to identify at least one audio source; and at least one content lock type to be applied to the at least one audio source.

The at least one content lock type may be at least one of: a translational lock for locking the at least one audio source translationally; a rotational lock for locking the at least one audio source rotationally; a head lock for locking the at least one audio source translationally and rotationally; a body lock for locking the at least one audio source rotationally and for not locking the at least one audio source translationally; a hard lock for locking the at least one audio source with no motion; and a soft lock for locking the at least one audio source within a range of values;

The trigger parameter may comprise at least one of: a viewport range defined in at least one of: azimuth and elevation; a time range; and an object identifier.

The apparatus caused to process the at least one audio signal based on the information associated with at least one audio source and content lock information, further based on the position and/or orientation input may be caused to: determine an occurrence of trigger event defined by a trigger parameter based on the position and/or orientation input; select a lock type processing based on the determined trigger event from the content lock type; and apply the selected lock type processing to the at least one audio signal.

The at least one selected lock type may comprise locking at least one of: a gain associated with the audio source; and a spatial extent associated with the audio source.

The apparatus may be further caused to: output the processed at least one audio signal as a rendered audio signal; and output the processed at least one image.

According to a third aspect there is provided a method comprising generating content lock information for a content lock, wherein the content lock information enables control of audio signal processing associated with audio signals related to one or more audio sources based on a position and/or orientation input.

The content lock information may furthermore enable control of image processing of images based on the position and/or orientation input.

Generating content lock information may comprise generating at least one of: a trigger parameter caused to activate a content lock; an identifier configured to identify at least one audio source; and at least one content lock type to be applied to the at least one audio source.

The at least one content lock type is at least one of: a translational lock for locking the at least one audio source translationally; a rotational lock for locking the at least one audio source rotationally; a head lock for locking the at least one audio source translationally and rotationally; a body lock for locking the at least one audio source rotationally and for not locking the at least one audio source translationally; a hard lock for locking the at least one audio source with no motion; and a soft lock for locking the at least one audio source within a range of values.

The trigger parameter may comprise at least one of: a viewport range defined in at least one of: azimuth and elevation; a time range; and an object identifier.

Generating content lock information may further comprise generating at least one of: an image effect to be applied to an image when the content lock is implemented; an audio effect to be applied by the audio signal processing when the content lock is implemented.

The content lock information may comprise interactivity information, wherein the interactivity information comprises at least one of: a trigger identifier caused to associate the information to at least one content lock trigger; an impact effect linked to the trigger identifier, the impact effect defining an effect to be applied by the audio signal processing associated with audio signals related to one or more audio sources based on a position and/or orientation input.

The at least one audio signalling processing effect may comprise at least one of: an emphasis in gain; a de-emphasis in gain; an increase in spatial extent; and a decrease in spatial extent.

The method may further comprise: obtaining the audio signals related to the one or more audio sources; analysing the audio signals to generate information related to the one or more audio sources; transmitting the audio signals, information related to the one or more audio sources and the content lock information to at least one apparatus.

Obtaining the audio signals related to the one or more audio sources may comprise at least one of: capturing the audio signals; and receiving the audio signals from at least one audio capture apparatus.

The method may further comprise: capturing at least one image, the image being associated with the one or more audio sources; and transmitting the at least one image with the audio signals, information related to the one or more audio sources and the content lock information to the at least one apparatus.

Transmitting the audio signals, information related to the one or more audio sources and the audio effect information to at least one apparatus may comprise transmitting the content lock information as one of: in-band information with the audio signals; and out-of-band information with the audio signals.

According to a fourth aspect there is provided a method comprising: receiving at least one audio signal; receiving information associated with at least one audio source; receive content lock information, the content lock information associated with at least one audio source; receiving at least one position and/or orientation input; and processing the at least one audio signal based on the information associated with at least one audio source and content lock information, further based on the position and/or orientation input.

The method may further comprise: receiving at least one image; and image process the at least one image based on the content lock information and the position and/or orientation input.

Receiving content lock information may comprise receiving at least one of: a trigger parameter caused to activate a content lock; an identifier configured to identify at least one audio source; and at least one content lock type to be applied to the at least one audio source.

The at least one content lock type may be at least one of: a translational lock for locking the at least one audio source translationally; a rotational lock for locking the at least one audio source rotationally; a head lock for locking the at least one audio source translationally and rotationally; a body lock for locking the at least one audio source rotationally and for not locking the at least one audio source translationally; a hard lock for locking the at least one audio source with no motion; and a soft lock for locking the at least one audio source within a range of values;

The trigger parameter may comprise at least one of: a viewport range defined in at least one of: azimuth and elevation; a time range; and an object identifier.

Processing the at least one audio signal based on the information associated with at least one audio source and content lock information, further based on the position and/or orientation input may comprise: determining an occurrence of trigger event defined by a trigger parameter based on the position and/or orientation input; selecting a lock type processing based on the determined trigger event from the content lock type; and applying the selected lock type processing to the at least one audio signal.

The at least one selected lock type may comprise locking at least one of: a gain associated with the audio source; and a spatial extent associated with the audio source.

The method may further comprise: outputting the processed at least one audio signal as a rendered audio signal; and outputting the processed at least one image. An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

FIG. 2a shows schematically a first metadata format according to some embodiments;

FIG. 2b shows schematically a second metadata format according to some embodiments;

FIG. 4 shows schematically an example content server and content client suitable for implementing the first metadata format according to some embodiments;

FIG. 5 shows a use case of 'head-locking' according to some embodiments;

FIGS. 6a to 6c show example use audio modification based on a 'head-locking' operation as may be implemented in some embodiments;

FIGS. 7a to 7c show further example use audio modification based on a 'head-locking' operation as may be implemented in some embodiments;

FIGS. 8a to 8c show further example use audio modification based on a 'head-locking' operation as may be implemented in some embodiments.

EMBODIMENTS OF THE APPLICATION

Figure 1:
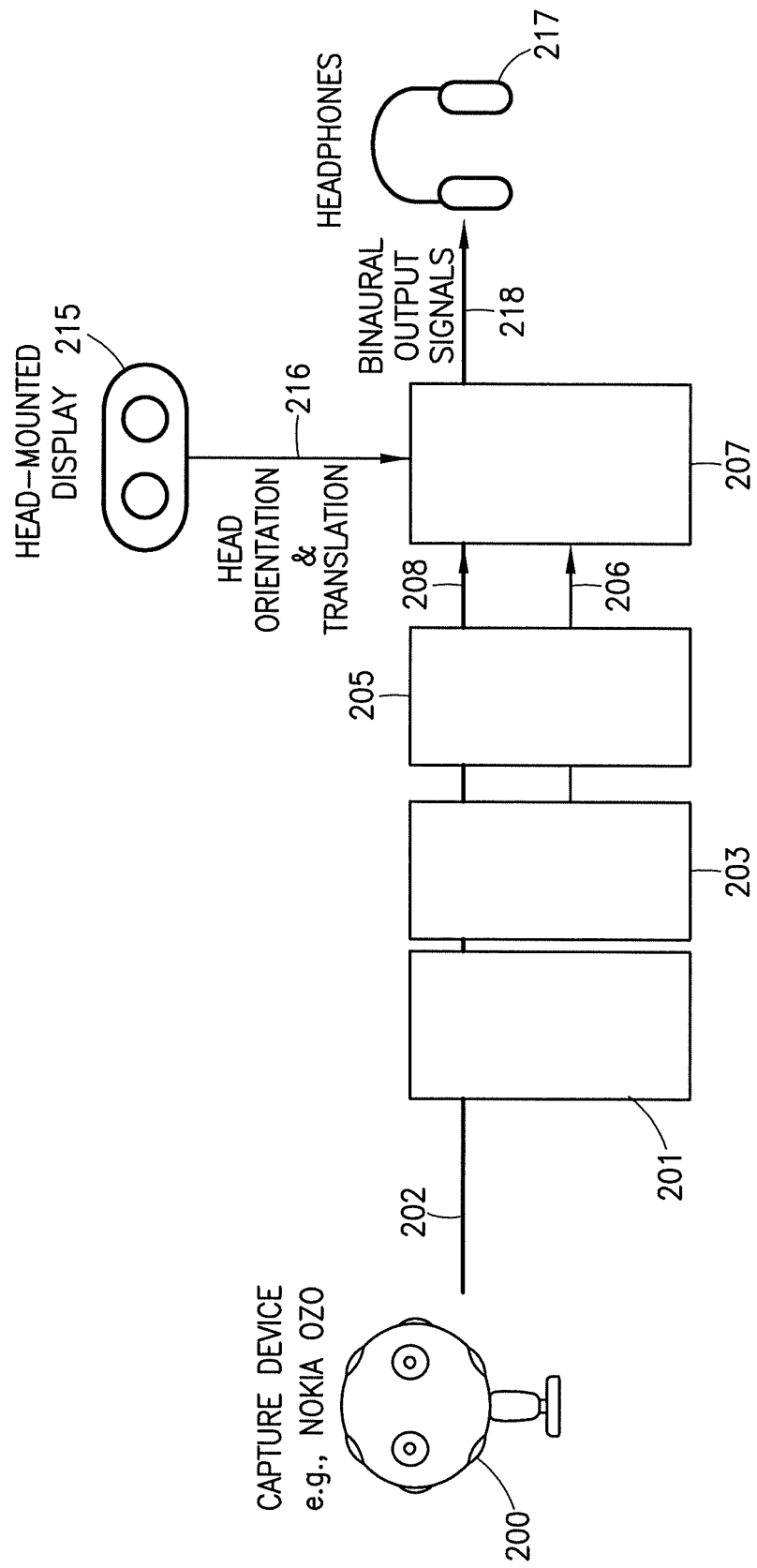
FIG. 1 shows schematically an example of a system suitable for implementing apparatus according to some embodiments.

The following describes in further detail suitable apparatus and possible mechanisms for the provision of effective spatial signal playback. Specifically the following describes apparatus and mechanisms for the provision of audio source head-locking for VR360 with (at least rotational) DoF where a viewing resolution/quality is aimed to be kept constant. In some embodiments the apparatus and mechanisms may applied to 3DoF, 3DoF+ and 6DoF augmented and virtual reality applications.

Specifically, the embodiments described hereafter in further detail provide apparatus and mechanism for head-locking particular content (or a part of it). Consequently, content such as legal notice is able to be rendered while consuming other 'omnidirectional' content (e.g., omnidirectional media application format or OMAF content). Thus in such embodiments legal notice or safety information is rendered to the user and able to be seen by the user without needing to disrupt the immersive content consumption experience. For example otherwise the system may have to remove the user from the environment and then put the user back which disrupts the user experience (twice). In addition to legal or safety notices these embodiments may be applied to insert advertisements or other content which the content creator marks as being mandatory for uninterrupted viewing or listening.

There is video and audio media content that the content creator, publisher, advertiser, software/hardware provider or even the law-maker may wish for the user to see.

As such the embodiments described hereafter show apparatus and mechanisms to lock such content to be within the user's field-of-view (FOV) and/or the user's audio field-of-interest (AFI) while still allowing the user some freedom of experience and choice of when to see or hear the mandatory content rather than for example switch the user's view to the mandatory content forcibly. Furthermore, such apparatus and mechanisms as described hereafter are configured to augment or enhance the content experience rather than overriding with the mandatory content.

The content lock may be defined as any one of many types of content lock. For example a 'Hard' lock is one in which no motion of the content object (for example the audio source or video image) is permitted whereas a 'Soft' lock is one in which a degree of motion of the content object is permitted. The soft lock may thus be defined with a possible motion range.

Furthermore the content lock may be defined in respect to the type of motion allowed or locked. For example one type of content lock may be a 'Head' lock where rotational and translational motion for the identified content object is not allowed. Another type of content lock may be a "Rotation" lock where rotational motion for the identified content object is not allowed (but translational motion may be allowed). A further type of lock may be a "Translation" lock where translational motion for the identified content object is not allowed (but rotational motion may be allowed). These types of locks may be combined to define hybrid locks, for example where there is a hard rotational lock and soft translational lock etc.

In some embodiments the lock may be defined with respect to one object (or source), more than one object or all of the objects (which may be defined as a world lock) in a scene.

Similarly the apparatus and mechanisms described hereafter in the following embodiments enable audio interactivity and disables modifying any rendering of the selected audio objects based on user gesture rather than require a user to 'move close' to an object of interest in the scene to interact with it (e.g. make the audio switch to mono/stereo inside user's head from externalized rendering).

The concepts as discussed herein are implemented in the embodiments by determining viewing information (for example viewing information may include 'trigger' information metadata) associated with an audio source or audio object linked with audio content where the viewing information indicates a type of rendering. In some embodiments based on the viewing information at least one parameter is signalled from a content server to a content (playback) client so as to enable/disable content locked audio/video content. The enabling or disabling of the head-locked content may be configured to accordingly override any audio or video processing associated with the user's head motion/rotation.

In such embodiments the parameter is read from a content file by the server and sent in a content bit stream to the client. The parameter can be defined and inserted into the file by, for example, a content creator or content formatter.

In some embodiments a further parameter may be signalled in the same manner. This further parameter comprises information about which/when audio objects become interactive and the effect of such interactivity. In some embodiments the information about which/when audio objects become interactive and the rendering effect of the subsequent interactivity may depend on the application preferences.

With respect to FIG. 1 is shown an example overview system. The system as shown in FIG. 1 shows an end to end workflow as well as content consumption.

The system comprises a capture device 200, a content processor 201, a content distributor formatter 203, a content server 205, a content client 207, a client input device 215, and a client output device 217.

The capture device 200 is shown in FIG. 1 as a Nokia OZO device 200 comprising a microphone array configured to capture audio signals and multiple cameras configured to capture images/video data. The capture device in some embodiments may be one or more apparatus configured to capture suitable media. For example the capture device with respect to the audio capture capability may comprise one or more of a microphone array, an ambisonics capture microphone, or a multi-microphone. The capture device may comprise one or more image/video capture devices such as cameras, depth of field camera, light-field cameras etc. The capture device may comprise one or more positioning devices which enable tracking or otherwise obtaining the position for one or more audio objects or audio sources captured with microphones. In addition to capture device 200, there may be other input methods for providing audio and/or image/video data 202 that will constitute at least a part of the scene. For example, various post-production tools can be used to add or modify audio objects.

The capture device may comprise one or more positioning devices which enable tracking or otherwise obtaining the position for one or more audio objects captured with microphones.

The audio and/or image/video data 202 may be passed to the content processor 201. The content processor 201 may be configured to receive the media captured by the capture device or other input device, service or software. In some embodiments the content processor is configured to analyse at least the audio signals to determine parameters or metadata associated with the audio scene. In some embodiments the image/video data may also be used to assist the analysis to determine the metadata. In some other embodiments the image/video data is processed by the content processor 201 to determine the metadata. In some embodiments, at least some of the determination of parameters or metadata associated with the audio scene may be carried out by a user through a user interface.

The content processor 201 can, for example, be a computer (running suitable software stored on memory and on at least one processor), or alternatively a specific device utilizing, for example, FPGAs or ASICs. As shown herein in further detail the audio source or audio object metadata may comprise, for each time-frequency analysis interval, at last one of: a position (such as an azimuth, elevation and distance or a direction and radius from a reference or 'sweet spot') parameter, an energy (such as an energy ratio or gain) parameter, a size/spread parameter. The direction parameter and the energy ratio parameters may in some embodiments be considered to be spatial audio parameters. In other words the spatial audio parameters comprise parameters which aim to characterize the sound-field.

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons.

These parameters and the media signals may furthermore be passed to the content distribution formatter 203. The content distribution formatter in some embodiments comprises a downmixer configured to receive the multi-channel audio signals and downmix the signals to a determined number of channels and output the downmix signals. For example the downmixer may be configured to generate a 2 audio channel downmix of the multi-channel signals. The determined number of channels may be any suitable number of channels. In some embodiments the downmixer is optional and the multi-channel audio signals are passed unprocessed to an encoder in the same manner as the downmix signal are in this example. In some embodiments, the audio may be represented as a channel-based bed and audio objects, first-order or higher-order ambisonics (FOA/HOA) and audio objects, any combination of these such as audio objects only, or any equivalent spatial audio representation.

Similarly the content distribution formatter 203 may be configured to encode the audio signals and/or spatial audio parameters in order to reduce bit rate, and multiplexed to one stream. The encoding and the multiplexing may be implemented using any suitable scheme. For example, the audio signals may be carried as MPEG-H 3D Audio, specified as ISO/IEC 23008-3 (MPEG-H Part 3), audio coding standard, along with the metadata. Coding of the audio as MPEG-H 3D audio and the additional metadata to enable listener translation and/or interactivity will be specified in the MPEG-I Audio standard.

In some embodiments a content creator, for example a user operating or editing the captured media provides information or specification metadata as part of the distribution file format and which comprises the at least one parameter which is able to be signalled from the server to the client so as to enable/disable a lock function with respect to at least some audio/video content. The distribution file may be the Omnidirectional Media Application Format (OMAF) version 2 specified in MPEG-I part 2 or other suitable format.

This information may for example be specified as metadata which is either delivered in-band with the audio data or out-of-band along with the audio and visual media streams.

Having generated a suitable media format such as media (audio and video signals), spatial audio parameters (or metadata) and behaviour control metadata these may be passed to a suitable content server 205.

In other words the content server 205 may be configured to receive suitable content (image/video and audio signals) and the metadata such as defined previously.

The content server 205 may be configured to store the formatted signals and transmit these to a content client 207. The signals shown in FIG. 1 are the media data (for example the audio signals, spatial audio metadata and video signals) 208 and the metadata 206.

With respect to some embodiments an example format of metadata is shown with respect to FIG. 2a. FIG. 2a thus shows an example of the metadata transferred from the content server 205 to the content client 207 in the form of lock-spot metadata.

For example in some embodiments the lock-spot metadata comprises a format such as shown by the following element
Lock type: Head lock
Trigger 1:
Viewport range (azimuth: 180-270),
Temporal persistence=5 seconds
Impact:
Locked content:
URI
Audio: object ID1, object ID2
Video: viewport: (azi1,ele1)
Duration: [T1,T2]

These elements comprise parameters which define the type of lock implemented, in this example a head lock (in other words a rotational and translational motion lock). The body lock may further be defined with respect to being a "hard locking" or a "soft locking" which allows some "natural" movement of the content rendering relative to the user. The hard lock in some embodiments may be the default option. This "soft locking" effect can be particularly useful for visual content and in some embodiments the allowed freedom according to the "soft locking" effect is likely to be inaudible, in other words the amount of movement allowed is too small to be determined by the average listener.

This example furthermore defines the trigger which implements the locking function—which in this example is for 3DOF content or it may have additional information giving the relative position in the 3D space and is defined by a viewport range of azimuth 180 degrees to 270 degrees and a 5 second lock. The parameters furthermore define the impact of the lock in the form of displaying a URI, locking the audio objects defined by id1 and id2 and locking a viewport to an azimuth azi1 and elevation ele1 for a time range between T1 and T2.

Furthermore a further metadata element is shown in FIG. 2a of
Lock type: Body lock
Trigger 2:
Content ID or URI
Time: T1
Impact:
Duration: [T1,T2]
Audio: object ID1, loudspeaker channels This element defines a further lock type, a body lock. A body lock may be a translational only lock.

Likewise, as discussed earlier one can define further lock types "Head lock without body lock" which is enables a rotational lock but without translational locking. Thus, in such examples the viewport will be fixed but translation may cause the playback apparatus to scale the content (apply distance/gain attenuation to audio objects and scale visual content according to user translation).

The signalling implementation of the embodiments requires that the content item for which head locking is to be applied needs to be identified, the condition when the head locking is to be implemented is described, and the duration when the locking is to be applied needs be specified. The content item identification can usually be the index or other unique identifier of the audio or visual object within the content metadata. In the case of MPEG-I audio, the content item can be an audio object which is individually encoded or an audio object embedded in the Spatial Audio Object Coding SAOC bistream. Furthermore, the MPEG-I phase 2 considers implementing 6DoF for higher order ambisonics (HOA). In some cases, the head locking can be implemented for portion of the HOA content, which means that the headlocked content can contain spatial information. For visual content, the content item can be a superimposed visual item (e.g. a 2D crop frame of still images or video or the like).

The condition describes when the head locking is to be implemented. The condition may be, for example: the user viewing the content item or near the content item longer than a predetermined time; the user going closer than a predetermined threshold distance to the content item; the user performing an interaction towards or at the content item; or the like.

The duration of effect may be defined, for example, as a time duration from the beginning of starting the head locking, or while the user remains within a threshold distance from the location when the head locking started, or the like. A default value may be the duration of the component stream (including any fade-in or fade-out effects).

Furthermore, the content description may indicate the effect which is to be applied when the system goes to the head locked mode and/or when it exits the head locked mode. The effect describes how the content item is to be rendered during the transition, and the duration of the transition. An example transition effect is to indicate that the audio content to be head-locked is to be first rendered at its original position, and then gradually spatially extended to cover a larger spatial area surrounding the user (including a definition of the spanned area). Correspondingly, the spatial span occupied by the visual content portion may be specified.

The description may also indicate what to apply for the rest of the content (the surrounding 6DoF content, if any) when the head locked content is shown. The alternatives are to keep the rest of the content as such (render without changes), render attenuated (either reduce volume level or make visual content darker or otherwise less prominent), or mute completely (audio silent and visual content dark).

With respect to FIG. 2b a further metadata format is shown being transferred between server and client. In the following examples orientation is defined by an azimuth value. In some embodiments the orientation may be defined by two values (for example both azimuth and elevation) but may be considered as a single parameter in the metadata.

Thus for example the interactivity metadata may comprise a format such as
Trigger 1:
Zoom Level:
View orientation:
View position
Impact:
Audio: object ID1
Effect: in-head stereo
Duration: X second
Or
Trigger 2:
Gesture: Lean forward
View orientation: Azimuth (A1,A2)
Impact:
Duration: [T1,T2]
Audio: object ID1
Effect: Dry:Wet ratio 2×

In other embodiments, the lock-spot information may be delivered out of band. In other words as a separate information by the server to the client. Consequently, the lock-spot information can be implemented as a viewing session dependent signalling. For example, the server may have a criteria for sending the lock-spot metadata (first time arrival of a client or for example with a previously unseen MAC address to a server).

The content client 207 may be configured to receive the signals such as the media data (for example the audio signals, spatial audio metadata and video signals) 208 and the audio effect specification metadata 206 from the content server 205 and render the signals to a suitable output such as a head mounted display 215 operating as an image/video output and headphones 217 operating as an audio output. Furthermore in some embodiments the content client may be configured to receive inputs from a suitable client input such as the head orientation and translation signals from the head-mounted display, a position/location estimate etc. The inputs may be used as parameters which cause the media signals to be processed or modified before being output. In some embodiments as discussed herein the media signals are modified based on the spatial audio metadata and furthermore based on the lock metadata.

The content client may be configured to operate such that when a user comes across a "lock spot" related to a video and/or audio content as defined by the metadata then the client causes activation of "head-locking" (or any other suitable content lock) of the video and/or audio content related to the "lock spot".

The "locked" content is presented to the user such that the user's head rotation or movement does not affect the rendering of the "locked" content at all (or in a reduced extent).

The "locked" content is presented to the user until the pre-defined segment completes.

The "locked" video content may occupy the whole viewport or only a part of it and it may be semi-transparent.

In case the "locked" video occupies only a part of the viewport, this may allow the user to change their orientation relative to the remaining view. However, also this remaining part may be "locked". This is controlled by a metadata. The "locked" audio content may override any other audio presentation or it may allow for simultaneous audio presentation of non-locked or locked (i.e., diegetic and non-diegetic) audio content. Similarly to video case, the "locking" of the specific content may result in locking of the (by default) diegetic audio content. This is controlled by a metadata. After completion of the presentation of the "locked" content, the default content presentation resumes either from the spatial point and/or temporal point where the "locked" content was launched or from a modified spatial and/or temporal point where the user movement during the "locked" presentation has been taken into account.

The "locked" content can be, e.g., an advertisement, a tutorial or learning experience, an augmentation to guide the user, a narration or other voice guidance, a temporary user interface allowing the user to complete a certain task, legal text, advice or rule or any other visual or audio content.

The locked content description contains identification of the content item, description of the condition when the head locking is to be commenced, and description of the condition when the head locking is to be stopped.

Optionally, the locked content description contains description of the transition effect when transiting into and out of the head locked mode for audio-visual content.

In addition to modification of content from world-locked (all content objects being locked rotationally and translationally) to head-locked (where some objects are locked rotationally and translationally), the method can consider body-locked content, where the user's torso is tracked (where some objects are locked rotationally only).

For example the method can consider content which is head-locked but not body locked, in which case a rotational-lock is applied any head (or object) translation causes changes in content rendering (e.g. scaling content appropriately for audio levels and/or visual size).

Figure 3:
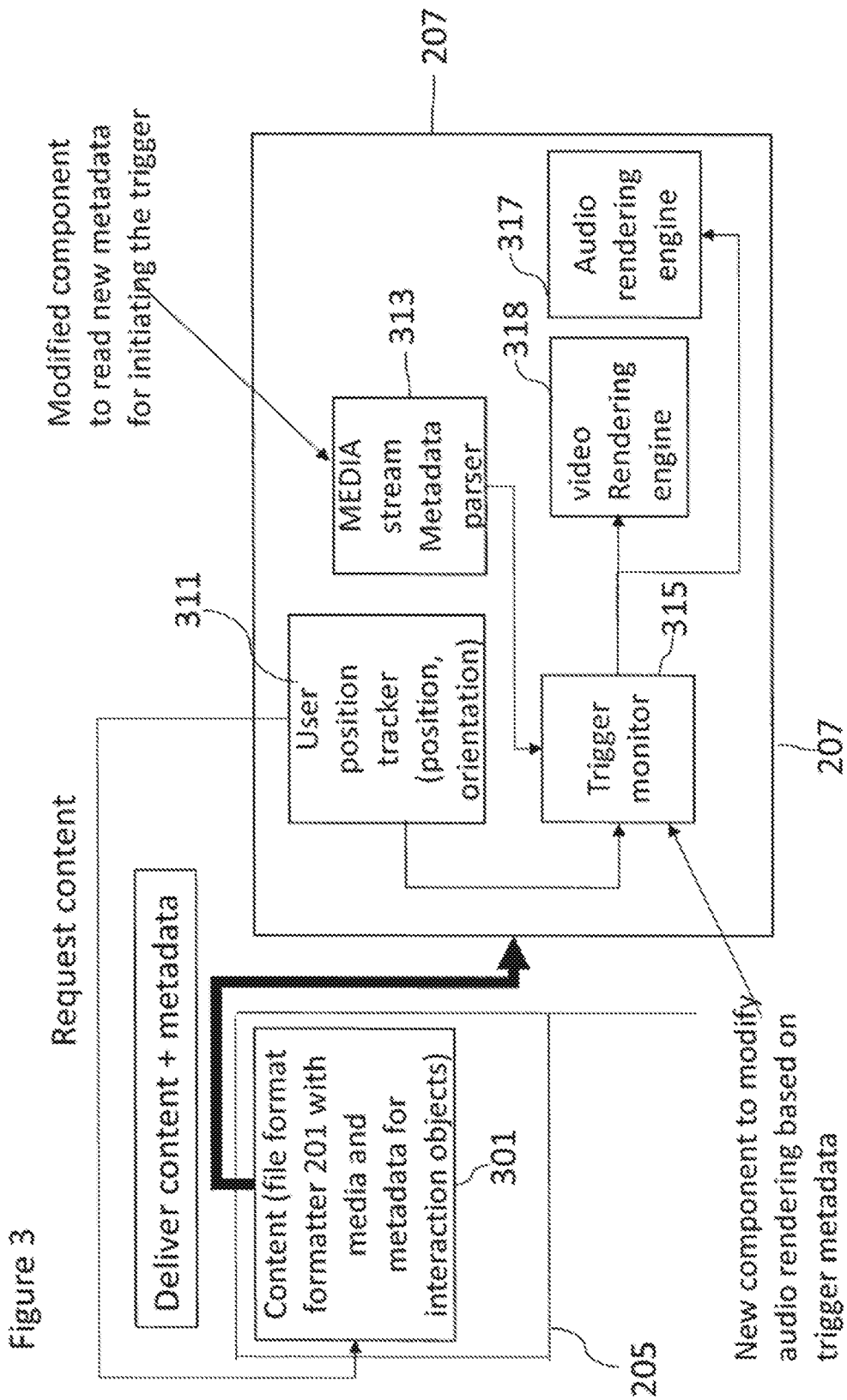
FIG. 3 shows schematically an example content server and content client suitable for implementing the second metadata format according to some embodiments.

With respect to FIG. 3 is shown an example implementation of the apparatus shown in FIG. 1 in further detail.

The content server 205 thus comprises content 301 which has been generated and formatted with the assistance of the file formatter with media data and metadata.

The content client 207 comprises a user position determiner/tracker 311 configured to receive inputs of the user's position, for example via the head mounted display and any other suitable input, and determine a user position in terms of translation (position) and rotation.

This information may be passed to the content server 205 via a content request and the content data sent to the content client.

In some embodiments the content client comprises a media/content stream metadata parser 313. The media/content stream metadata parser 313 is configured to extract lock-spot (and in some embodiments also interactivity) metadata from the supplied content data and to update a trigger monitor with respect to any new metadata elements.

In some embodiments the content client further comprises a trigger monitor 315. The trigger monitor 315 is configured to receive the extracted lock-spot metadata and further configured to receive the user position and orientation values and monitor whether the user position and orientation corresponds to one or more of the elements within the lock-spot metadata.

When the trigger monitor 315 determines that the user position and orientation values correspond to one or more lock-spot metadata elements, in other words that a 'lock' trigger has been activated then this may be signalled to an audio rendering engine 317 and to a video rendering engine 318.

The content client 207 in some embodiments comprises an audio rendering engine 317. The audio rendering engine 317 in some embodiments is configured to receive the audio components of the content, for example downmixed or otherwise audio signals and furthermore spatial metadata associated with the audio signals and render the audio signals to be output to the user of the content client based on the output of the trigger monitor 315.

The rendering implementation for locking the content may for example be performed as follows.

Consider, for example, an audio object (or content element) which is located at Cartesian world coordinates ($x_o$, $y_o$, $z_o$) (and which in some embodiments may be time varying). The user position is denoted with Cartesian coordinates ($x_u$, $y_u$, $z_u$), and head orientation with yaw, pitch, roll. When 6DoF audio signals are rendered to the user, the user position determiner/tracker 311 may, for example, first obtain the translated object position as ($x_o-x_u$, $y_o-y_u$, $z_o-z_u$). Then, the user position determiner/tracker 311 may convert the translated object position to spherical coordinates as azimuth, elevation, distance, and pass these to the audio rendering engine 317. The audio rendering engine 317 may further account for the head rotation to update the object position with respect to the user head. Rendering the object with the updated object position may be performed using any suitable manner, for example, head-related-transfer-function (HRTF) filtering for binaural reproduction or Vector-Base-Amplitude-Panning (VBAP) for loudspeaker reproduction.

When an object is head locked, the object position is not translated and the head rotation is not compensated for. This causes the object to be rendered at the fixed position with respect to the user head.

The content client 207 in some embodiments comprises a video rendering engine 318. The video rendering engine 318 in some embodiments is configured to receive the video images and render the image relative to the determined viewport and based on based on the output of the trigger monitor 315.

The system is shown further with respect to FIG. 4 which shows the server 205 comprising a content file comprising trigger information 411 in the form of lock-spot metadata as shown by elements 421 and 431 and interaction metadata as shown by elements 441 and 451.

With respect to FIG. 5 a first example illustrating a user activating "head-locking" of at least one video and/or audio content is shown. In this example the user has a first position/orientation 501 and is surrounded by content located around the user such as first content element 513, second content element 511, third content element 515 and fourth content element 517. With respect to this scene the fourth content element, for example a displayed safety notice and audio message, is in an unlocked state on the left hand side of the figure. For example, said audio message may or may not be presented to the user at this point.

However when the user moves and views the fourth content element, corresponding to the displayed safety notice and audio message, by rotating to a second position/orientation 503, then the user triggers a 'lock spot' and the fourth content element is set to a 'locked' state. For example, the playback of the audio message may begin at this point if it was not yet being presented, and said audio message will from then on remain in a non-diegetic mode until the signalled duration is over. After this, if the audio message still continues, it can transition back into its default rendering (including its rendering position) and default mode which may be diegetic or non-diegetic. The information on the region and any (optional) additional condition or rendering effect is provided to the renderer via the metadata signalling.

Figure 6A:
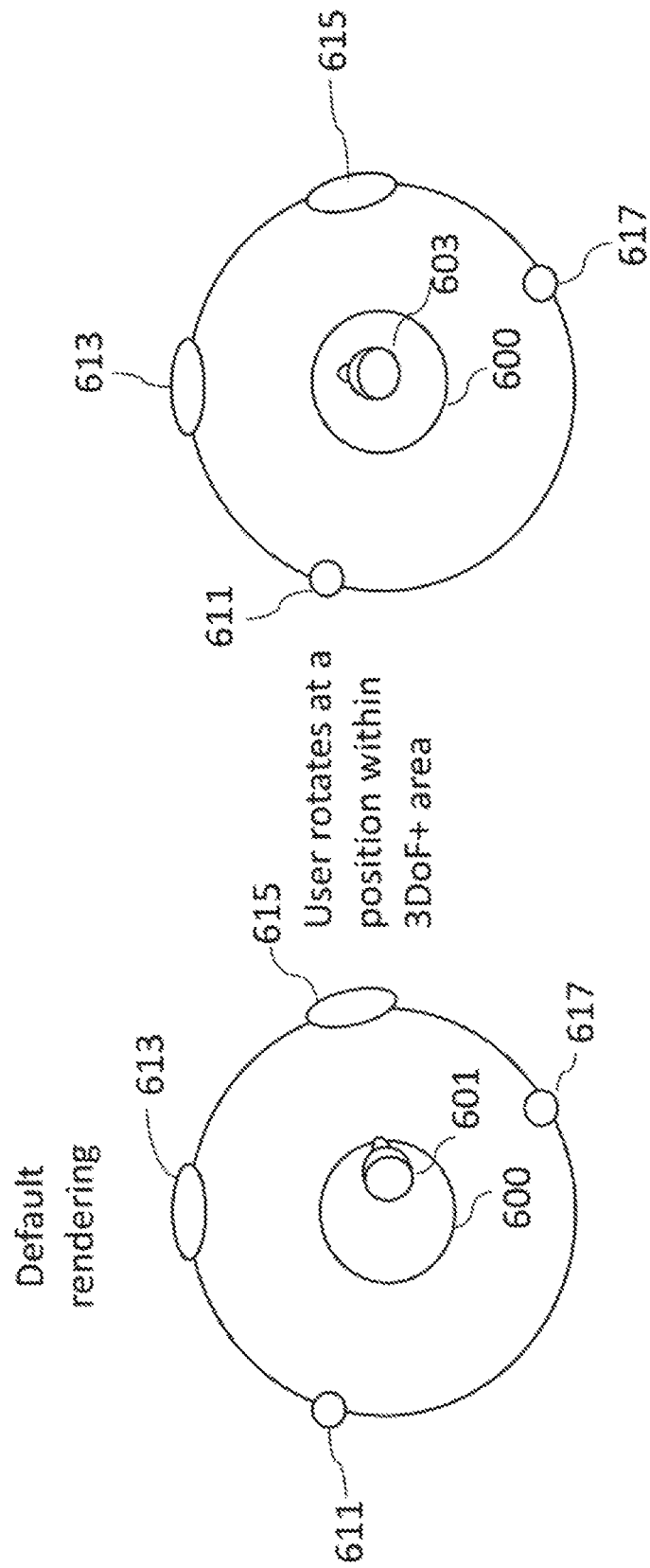
Figure 6B:
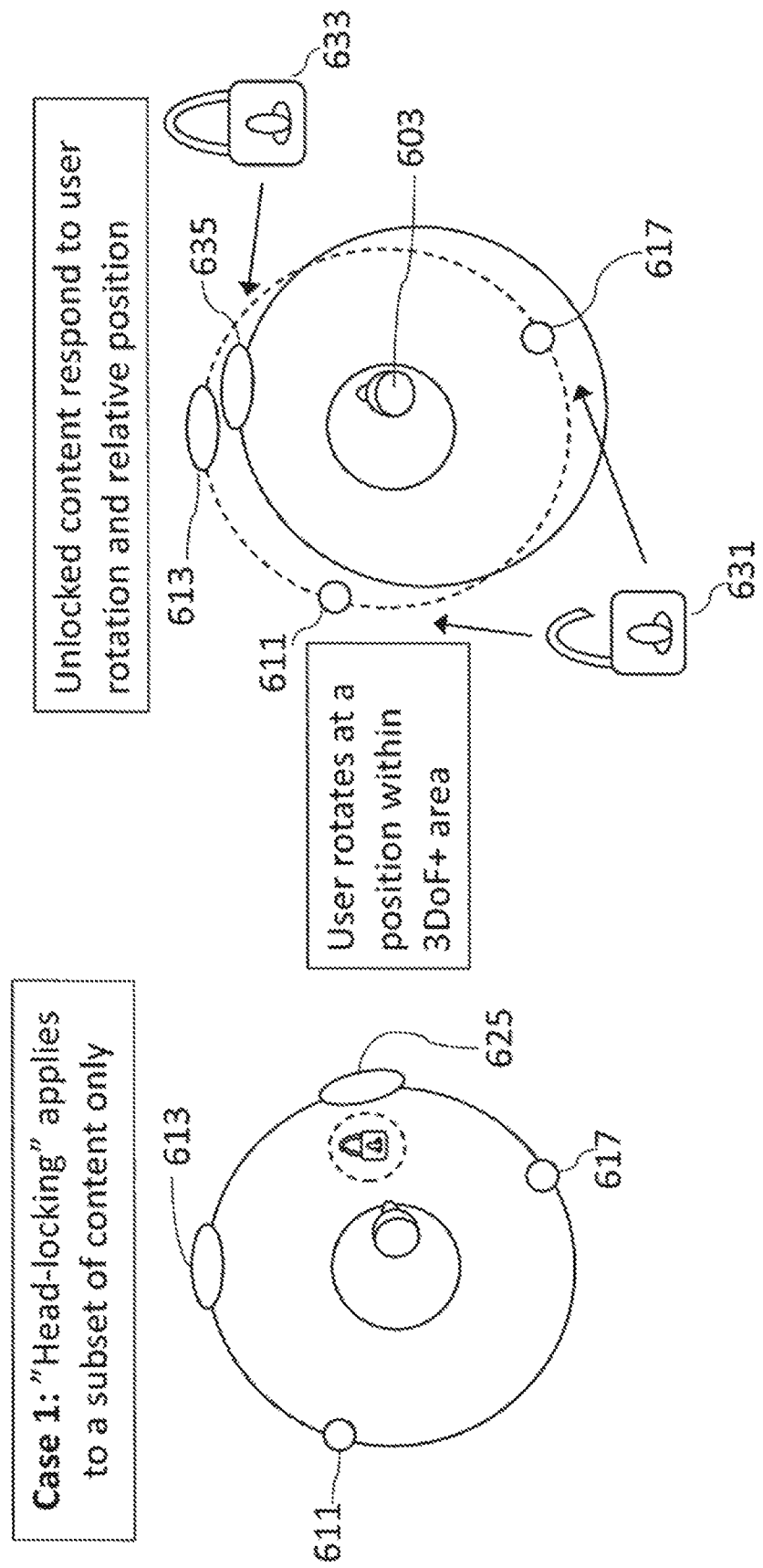

FIGS. 6a and 6b present an illustration of the use and resulting rendering modification(s) of the invention in a 3DoF+ environment 600 in more detail. FIG. 6a firstly illustrates a default rendering (e.g., without the implementation of a lock spot), where a user at a first position/rotation 601 is experiencing 3DoF+ content. The content is represented by first content element 613, second content element 611, third content element 615 and fourth content element 617. The user in this situation is able to view and hear from a forwards position the third content element 615, for example a displayed safety notice and audio message.

The user rotates to a second position/rotation 603 within the 3DoF+ space 600. In an unlocked experience this corresponds to a user rotating in a real-world environment in the sense that the content direction remains "world-locked" in that the user second position/rotation 603 within the 3DoF+ space 600. In other words the user may not be able to view (and the sound may be relegated to a peripheral experience) the third content element 615 as the unlocked object "moves clockwise" as the user rotates in an anti-clockwise motion.

FIG. 6b presents the same case according to some embodiments where a single content element is "head-locked". The left hand side of the figure is the same as the left hand side of FIG. 6a but where the third content element is a locked third content element 625, but the first content element 613, second content element 611 and fourth content element 617 are unlocked. The right hand side of the figure shows the same motion of the user to the second position/rotation 603 but whereas the unlocked content elements 611, 613 and 617 'move' relative to the user view because of the motion of the user the locked third content element 625 is still located such that the user is able to view and hear from the same forward position the locked third content element 625.

FIG. 6c shows an example the all content elements are "head-locked". The left hand side of the figure is the same as the left hand side of FIG. 6a but where the first content element is a locked first content element 641, the second content element is a locked second content element 643, the third content element is a locked third content element 645, and the fourth content element is a locked fourth content element 647. The right hand side of the figure shows the same motion of the user to the second position/rotation 603 but where the unlocked content elements would 'move' relative to the user view because of the motion of the user the locked content element 625 are still located at the same positions relative to the user. In other words the content is experienced as if the user was located at the first position/orientation and is independent of the user's current position/orientation and in such a manner the user is able to view and hear from the same forward position the locked third content element 645.

FIGS. 7a to 7c and 8a to 8c show further examples of users consuming VR content when implementing embodiments as described herein.

Thus FIG. 7a shows a user 701 experiencing first audio object, $object_1$, 703 located at a distance $d_1$, second audio object, $object_2$, 705 located at distance $d_2$, third audio object, $object_3$ 707 located at $d_3$ and fourth audio object, $object_4$ 709 located at $d_4$. The audio objects with spatial audio are rendered as externalized sounds.

FIG. 7b shows the same scenario but where the user leans forward 702 to now be located at a second position/orientation 711.

FIG. 7c shows the effect of the scenario shown in FIG. 7b but where the second audio object has been locked, for example due to a trigger metadata definition (such as making audio objects interactive only in particular orientation and zoom levels for example at zoom level 2×). In this example the audio source continues to be 'externalised'.

FIG. 8a shows the user performing a suitable zoom (e.g. 2×) which un-triggers or disables the lock defined by the trigger metadata definition (such as making audio objects interactive only in particular orientation and zoom levels for example at zoom level 2×) and a leaning forward motion.

FIG. 8b shows the effect of the leaning forward motion as the object$_2$ moves from being externalized to being rendered as an in-head stereo rendering.

Figure 9:
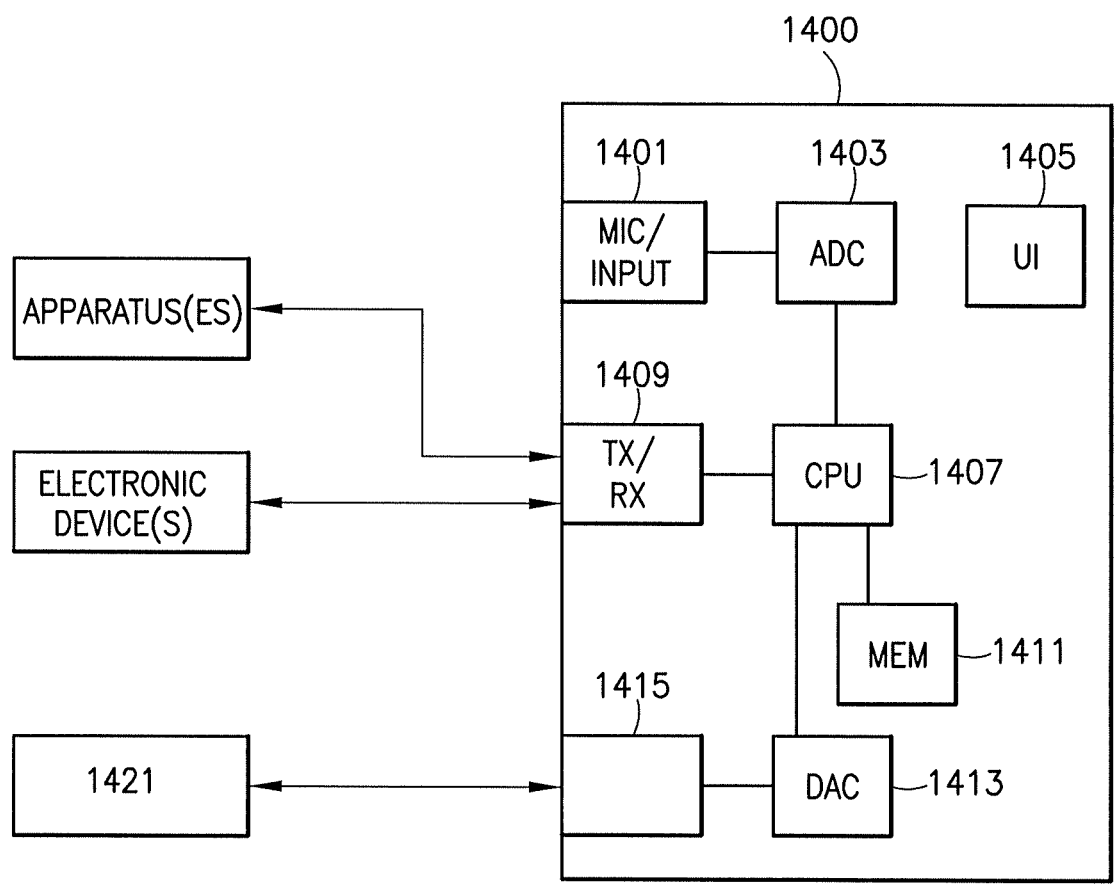
FIG. 9 shows schematically an example device suitable for implementing the content client and/or content client as shown in FIG. 1.

FIG. 8c then shows the effect of the object$_2$ located within the head irrespective of lateral or rotational movement With respect to FIG. 9 an example electronic device which may be used as the content client device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the loudspeaker signals and in some embodiments determine the parameters as described herein by using the processor 1407 executing suitable code. Furthermore the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising
at least one processor and
at least one non-transitory memory including computer code for one or more programs, the at least one memory and the computer code configured, with the at least one processor, to cause the apparatus at least to:
generate content lock information for a content lock, wherein the content lock is associated with at least one audio source, wherein the content lock information enables control of audio signal processing associated with audio signals related to the at least one audio source based on a position and/or orientation input relative to the at least one audio source; and
provide the content lock information for the audio signal processing associated with the audio signals.

2. The apparatus as claimed in claim 1, wherein the content lock information is configured to enable control of image processing of images based on the position and/or orientation input, wherein the at least one audio source comprises at least one audio object.

3. The apparatus as claimed in claim 1, wherein the generated content lock information is configured to cause the apparatus to generate at least one of:
a trigger parameter configured to activate the content lock;
an identifier configured to identify the at least one audio source; or
at least one content lock type to be applied to the at least one audio source
as part of the content lock information.

4. The apparatus as claimed in claim 3, wherein the at least one content lock type is at least one of:
a translational lock for locking the at least one audio source translationally;
a rotational lock for locking the at least one audio source rotationally;
a head lock for locking the at least one audio source translationally and rotationally;
a body lock for locking the at least one audio source rotationally and for not locking the at least one audio source translationally;
a hard lock for locking the at least one audio source with no motion; or
a soft lock for locking the at least one audio source within a range of values.

5. The apparatus as claimed in claim 3, wherein the trigger parameter comprises at least one of:
a viewport range defined in at least one of: azimuth or elevation;
a time range; or
an object identifier.

6. The apparatus as claimed in claim 3, wherein the generated content lock information is configured to cause the apparatus to generate at least one of:
an image effect to be applied to an image when the content lock is implemented; or
an audio effect to be applied by the audio signal processing when the content lock is implemented.

7. The apparatus as claimed in claim 1, wherein the content lock information comprises interactivity information, wherein the interactivity information comprises at least one of:
a trigger identifier caused to associate the interactivity information to at least one content lock trigger; or
an impact effect linked to the trigger identifier, the impact effect defining an effect to be applied by the audio signal processing associated with the audio signals related to the at least one audio source based on the position and/or orientation input.

8. The apparatus as claimed in claim 7, wherein the impact effect comprises at least one of:
an emphasis in gain;
a de-emphasis in the gain;
an increase in spatial extent; or
a decrease in the spatial extent.

9. An apparatus comprising
at least one processor and
at least one non-transitory memory including computer code for one or more programs, the at least one memory and the computer code configured, with the at least one processor, to cause the apparatus at least to:
generate content lock information for a content lock, wherein the content lock information enables control of audio signal processing associated with audio signals related to one or more audio sources based on a position and/or orientation input;
obtain the audio signals related to the one or more audio sources;
analyse the audio signals to generate information related to the one or more audio sources; and
transmit the audio signals, the information related to the one or more audio sources and the content lock information to at least one further apparatus.

10. The apparatus as claimed in claim 9, wherein the apparatus is further configured to cause at least one of:
capture the audio signals; or
receive the audio signals from at least one audio capture apparatus.

11. The apparatus as claimed in claim 9, wherein the apparatus is configured to further cause:
capture at least one image, the image being associated with the one or more audio sources; and transmit the at least one image with the audio signals, the information related to the one or more audio sources and the content lock information to the at least one further apparatus.

12. An apparatus comprising
at least one processor and
at least one non-transitory memory including computer code for one or more programs, the at least one memory and the computer code configured, with the at least one processor, to cause the apparatus at least to:
receive at least one audio signal;
receive information associated with at least one audio source, wherein the at least one audio signal is related to the at least one audio source;
receive content lock information for a content lock, the content lock information associated with the at least one audio source;
receive at least one position and/or orientation input relative to the at least one audio source; and
process the at least one audio signal based on the information associated with at least one audio source and the content lock information, further based on the position and/or orientation input.

13. The apparatus as claimed in claim 12, where the apparatus is further configured to cause:
receive at least one image; and
image process the at least one image based on the content lock information and the position and/or orientation input.

14. The apparatus as claimed in claim 12, wherein the apparatus caused to receive the content lock information is further configured to cause receiving at least one of:
a trigger parameter configured to activate the content lock;
an identifier configured to identify the at least one audio source; or
at least one content lock type to be applied to the at least one audio source.

15. The apparatus as claimed in claim 14, wherein the at least one content lock type is at least one of:
a translational lock for locking the at least one audio source translationally;
a rotational lock for locking the at least one audio source rotationally;
a head lock for locking the at least one audio source translationally and rotationally;
a body lock for locking the at least one audio source rotationally and for not locking the at least one audio source translationally;
a hard lock for locking the at least one audio source with no motion; or
a soft lock for locking the at least one audio source within a range of values.

16. The apparatus as claimed in claim 14, wherein the trigger parameter comprises at least one of:
a viewport range defined in at least one of: azimuth or elevation;
a time range; or
an object identifier.

17. The apparatus as claimed in claim 12, wherein the apparatus, based on the position and/or orientation input, is further configured to cause:
determine an occurrence of trigger event defined by a trigger parameter based on the position and/or orientation input;
select a lock type processing based on a content lock type of the determined trigger event; and
apply the selected lock type processing to the at least one audio signal.

18. The apparatus as claimed in claim 17, wherein the at least one selected lock type processing comprises locking at least one of:
a gain associated with the at least one audio source; or
a spatial extent associated with the at least one audio source.

19. A method comprising
generating content lock information for a content lock, wherein the content lock is associated with at least one audio source, wherein the content lock information enables control of audio signal processing associated with audio signals related to the at least one audio source based on a position and/or orientation input relative to the at least one audio source; and
providing the content lock information for the processing associated with the audio signals.

20. A method comprising:
receiving at least one audio signal;
receiving information associated with at least one audio source, wherein the at least one audio signal is related to the at least one audio source; and
receiving content lock information for a content lock, the content lock information associated with the at least one audio source;
receiving at least one position and/or orientation input relative to the at least one audio source; and
processing the at least one audio signal based on the information associated with at least one audio source and the content lock information, further based on the position and/or orientation input.

* * * * *